March 3, 1970  C. PORQUET ET AL  3,498,140
CENTRIFUGAL GOVERNOR

Filed Jan. 15, 1968  2 Sheets-Sheet 2

CHRISTIAN PORQUET
PIERRE VENTRE
   INVENTORS

BY
*Stevens, Davis, Miller & Mosher*
   ATTORNEYS

3,498,140
CENTRIFUGAL GOVERNOR
Christian Porquet and Pierre Ventre, Billancourt, France, assignors to Regie Nationale des Usines Renault, Billancourt, Hauts-de-Seine, and Automobiles Peugeot, Paris, France
Filed Jan. 15, 1968, Ser. No. 698,039
Claims priority, application France, Jan. 18, 1967, 91,645
Int. Cl. G01p 3/18
U.S. Cl. 73—535                3 Claims

ABSTRACT OF THE DISCLOSURE

Governor for controlling the movement of a member as a function of the velocity of rotation of any shaft, characterised in that the driving shaft and the driven member to be moved are interconnected by a coupling member consisting of a plastic material in which inertia weights are incorporated, said inertia weights being adapted, under the influence of the centrifugal force and as a consequence of the elastic bending of the plastic coupling member, to move said driven member to a position subordinate to the velocity of rotation of said driving shaft against the action of return spring means.

---

The present invention relates to governors and has specific reference to improvements in or relating to governors.

It is known to use a ball governor for solving the frequently occurring problem consisting in controlling the movement of a member as a function of the rotational speed of a shaft. It is also known that this device is objectionable on account of its insufficient fidelity and sensitiveness due to the frictional contacts developing in the relatively great number of articulations and connections necessary for its operation.

It is the essential object of the present invention to provide a governor capable of eliminating these inconveniences in a simple yet efficient and unexpensive manner.

The governor according to this invention is characterised essentially in that the driving member and the member to be moved as a function of the shaft speed are interconnected by a body made of suitable plastic material incorporating inertia weights adapted, under the influence of the centrifugal force, to cause the elastic bending of the plastic body and thus move the controlled member to a position strictly subordinate to the speed of the driving shaft, against the resistance of a return spring.

Figure 1:
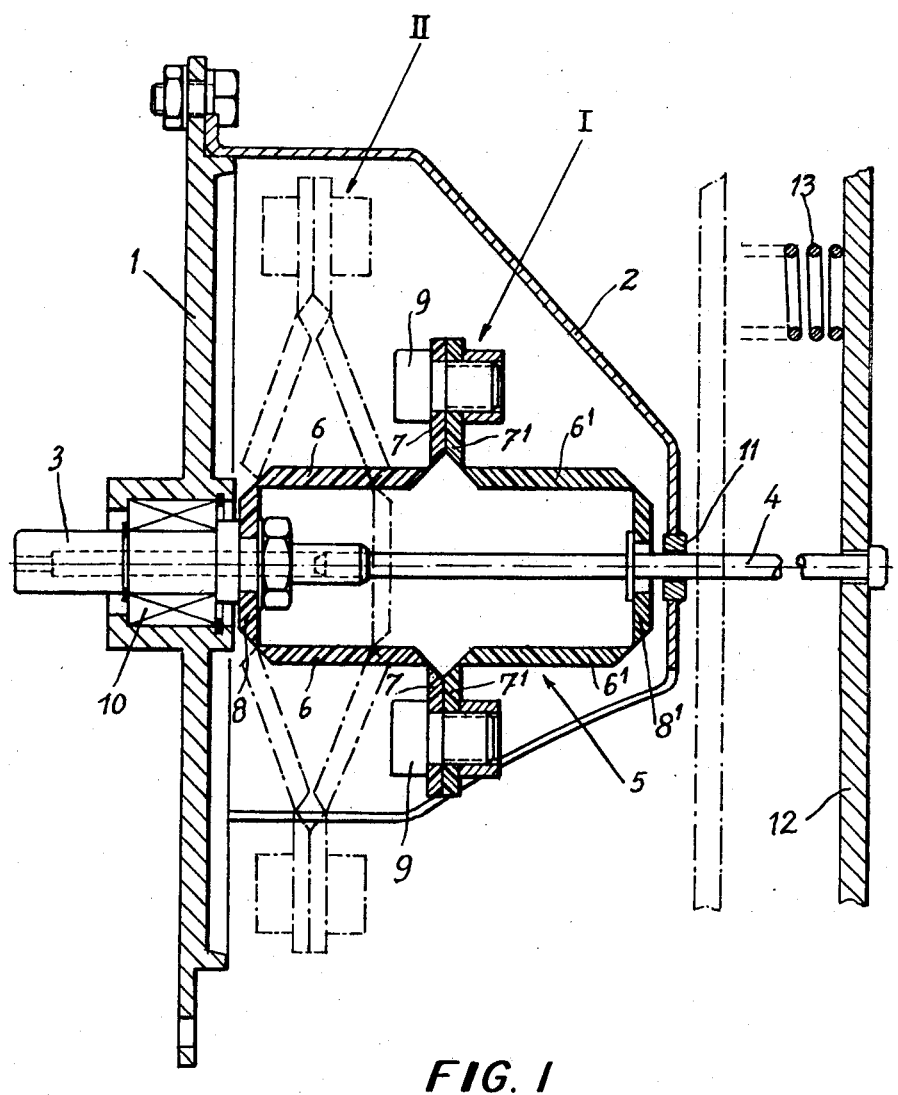
Figure 2:
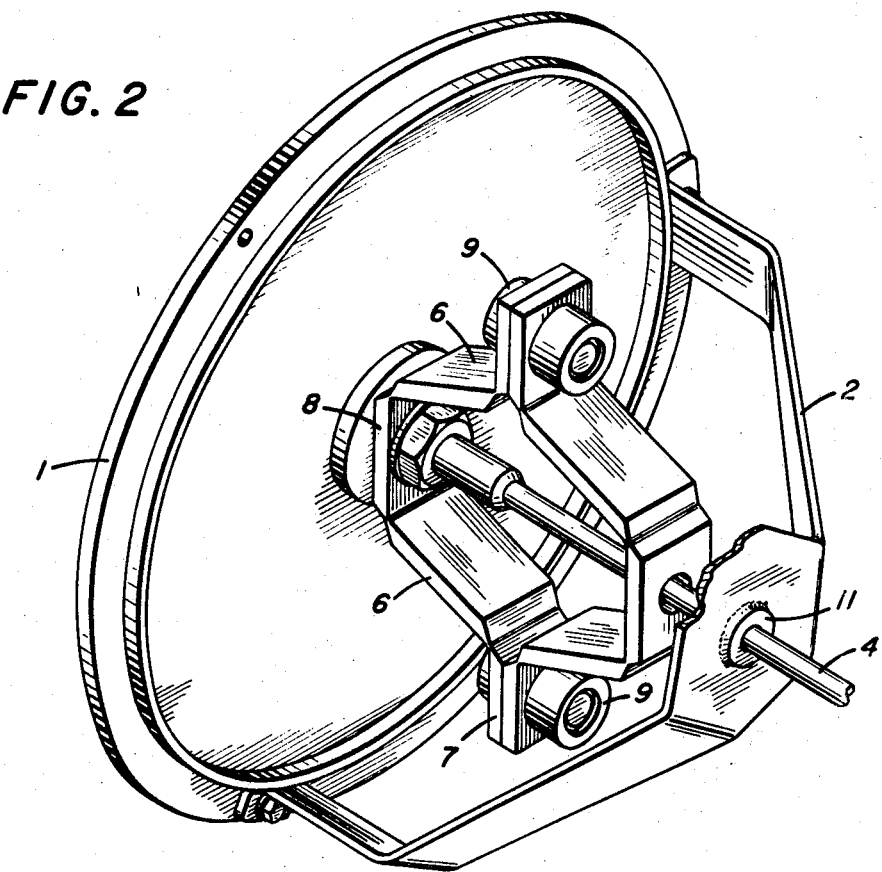

Reference will now be made by way of example to the accompanying drawings illustrating a typical form of embodiment of the governor, in which:

FIG. 1 is a cross sectional view of the governor; and
FIG. 2 is a perspective view of the governor.

The embodiment illustrated consists for example of a flange or case 1 secured to a bell-shaped cover 2, and a movable member consisting of a tubular driving shaft 3 and a movable rod 4 slidably fitted in the axial bore or passage of this shaft 3. The driving shaft 3 and movable rod 4 are coupled through a flexible body 5 consisting of a suitable plastic material corresponding to the pivotal connections necessary for operating a conventional ball regulator. In this specific form of embodiment (which should not be construed as limiting the present invention) the plastic body consists of two flanged C-shaped elements 6 and $6^1$ assembled by their flanges 7 and $7^1$ and having their bases 8 and $8^1$ opposite to these flanges secured to shaft 3 and rod 4, respectively.

The plastic material constituting the coupling member 5 must have a high resistance to repeated folding stress under reduced thickness, such as polypropylene, particular care being exerted during the moulding operation.

Secured to this coupling member 5 are a plurality of inertia weights 9 disposed at spaced angular intervals to ensure a proper equilibrium of the assembly. The driving shaft 3 is mounted in a bearing supported by the case or flange 1 and the movable rod 4 is slidably fitted in a bearing 11 of cover 2 and also in the axial bore of driving shaft 3. This movable rod 4 is adapted to drive in turn any desired member, for example a plate 12 normally urged to its inoperative or initial position by spring means shown diagrammatically at 13.

This governor operates as follows:

When, by virtue of any suitable driving means, the shaft 3 rotatably drives the plastic coupling member 5 the centrifugal force acting upon the inertia weights 9 causes the bending of the plastic coupling member 5 and therefore the movement of the weights 9 from position I to position II. The movable rod 4 attached to the base of element $6^1$ of plastic coupling 5 is thus moved into the bore of shaft 3 until the centrifugal force equals the return force of spring means 13.

Thus the plate 12 is moved to a position strictly subordinate to the velocity of rotation of the shaft 3 drivingly connected in turn to driving means (not shown). The plastic coupling 5 may have any suitable shape and must be capable of undergoing an elastic bending under the influence of the centrifugal force acting upon the inertia weights 9 incorporated therein.

Of course, various modifications and variations may be brought to the specific form of embodiment shown and illustrated herein by way of example, without inasmuch departing from the spiirt and scope of the invention as set forth in the appended claims.

What is claimed is:

1. A governor for controlling the movement of a member as a function of the velocity of rotation of a shaft comprising a driving shaft, a linearly movable driven member, return spring means acting upon said driven member, a coupling member consisting of a plastic material having spaced first and second portions, respectively, connected to said driving shaft and said driven member and an interconnecting portion extending between said first and second portions along the axis of said shaft, said portions being connected by joints of reduced thickness forming bending points, inertia weights fixed to said interconnecting portion between further joints of reduced thickness forming additional bending points, said inertia weights, under the influence of centrifugal forces causing bending of said coupling member about said bending points thereby linearly moving said driven member against the action of said return spring means to a position indicative of the velocity of rotation of said driving shaft.

2. A governor according to claim 1 in which said driving shaft is hollow, said driven member including a rod one end of which is slidably mounted in the bore of said driving shaft and the other end of which is connected to said driven member, said second portion being connected to said rod.

3. A governor according to claim 1 in which said coupling member comprises two C-shaped elements each having a base corresponding to said first and second portions, integral upstanding arms and radially extending flanges at the free ends of said arms forming said interconnecting portion, an annular opening in each said base, said flanges fastened together by said inertia weights, the bases of said elements connected to said driving shaft and said driven member, respectively.

References Cited

UNITED STATES PATENTS

| | | | |
|---|---|---|---|
| 1,305,882 | 6/1919 | Cherington | 73—546 |
| 1,850,807 | 3/1932 | Panish | 73—546 |
| 2,064,669 | 12/1936 | Lansing | 73—546 |
| 2,064,779 | 12/1936 | Briggs | 73—546 |
| 2,367,254 | 1/1945 | Abbot | 73—535 |
| 2,374,434 | 4/1945 | Jensen | 73—535 |
| 3,028,461 | 4/1962 | Pearce | 73—535 |
| Re. 14,561 | 12/1918 | Rivers | 73—547 |
| 1,197,371 | 9/1916 | Herr | 73—547 |
| 1,214,287 | 1/1917 | Douglas | 73—547 |
| 2,444,257 | 6/1948 | Jenner | 73—547 |
| 2,584,703 | 2/1952 | Hollerith | 73—493 |

JAMES J. GILL, Primary Examiner

U.S. Cl. X.R.

73—546